United States Patent [19]

Hall et al.

[11] Patent Number: 5,375,923
[45] Date of Patent: Dec. 27, 1994

[54] DRAWER FRONT ATTACHMENT SYSTEM

[75] Inventors: Brian L. Hall, Clear Lake; Paul L. Backer, Mason City, both of Iowa

[73] Assignee: Fieldstone Cabinetry, Inc., Northwood, Iowa

[21] Appl. No.: 78,717

[22] Filed: Jun. 16, 1993

[51] Int. Cl.⁵ .................. A47B 88/00; B25G 3/00
[52] U.S. Cl. .............. 312/348.4; 312/330.1; 403/2; 403/21
[58] Field of Search .............. 403/2, 21, 22; 312/330.1, 348.4

[56] References Cited

U.S. PATENT DOCUMENTS

| | | | |
|---|---|---|---|
| 3,967,432 | 7/1976 | Starr | 403/21 |
| 4,518,278 | 5/1985 | Koch | 403/230 |
| 4,589,710 | 5/1986 | Rock et al. | 312/348.4 |
| 4,609,236 | 9/1986 | Twellman | 312/330.1 |
| 4,690,469 | 9/1987 | Grass | 312/330.1 |
| 4,775,202 | 10/1988 | Röck et al. | 312/330.1 |
| 4,815,798 | 3/1989 | Röck et al. | 312/330.1 |
| 4,832,420 | 5/1989 | Röck et al. | 312/330.1 |
| 4,846,538 | 7/1989 | Röck et al. | 312/330.1 |
| 4,850,659 | 7/1989 | Röck et al. | 312/330.1 |
| 4,902,080 | 2/1990 | Berger | 312/348.4 |
| 4,961,614 | 10/1990 | Röck et al. | 312/348.4 |
| 4,995,683 | 2/1991 | Albiez | 312/348.4 |
| 5,076,723 | 12/1991 | Berger | 312/330.1 |
| 5,147,124 | 9/1992 | Grass et al. | 312/348.4 |
| 5,154,385 | 10/1992 | Lindberg et al. | 403/21 |
| 5,281,022 | 1/1994 | Rock | 312/348.4 |

FOREIGN PATENT DOCUMENTS

| | | | |
|---|---|---|---|
| 0267477 | 5/1988 | European Pat. Off. | |
| 4-92605 | 3/1992 | Japan | 312/348.4 |
| 4-183409 | 6/1992 | Japan | 312/348.4 |
| 5-7515 | 1/1993 | Japan | 312/348.4 |
| 2182546 | 5/1987 | United Kingdom | 312/348.4 |

Primary Examiner—Richard A. Bertsch
Assistant Examiner—Howard R. Richman
Attorney, Agent, or Firm—Edgar A. Zarins; Malcolm L. Sutherland

[57] ABSTRACT

A drawer front attachment system for securing the drawer face panel to the drawer body in proper orientation. The attachment system includes a tightening fastener rotatably mounted in a perpendicular bore of the drawer body and a connector assembly secured to the drawer front and selectively engageable with the tightening fastener. The connector assembly has a base housing inserted into a blind bore on the rear of the drawer front and a fastener rod threadably connected to the box housing. The fastener rod includes a head which is lockingly received within the tightening fastener. As the tightening bolt is rotated the fastener rod is cammingly pulled firmly joining the drawer front to the drawer body. The base housing includes a positionally captured fastener nut which facilitates adjustment of the drawer front relative to the drawer body for proper orientation.

10 Claims, 4 Drawing Sheets

DRAWER FRONT ATTACHMENT SYSTEM

BACKGROUND OF THE INVENTION

I. Field of the Invention

This invention relates to an attachment system for the front panel of a drawer and, in particular, to an attachment system which allows proper orientation and adjustment of the drawer front while simplifying attachment and replacement of the drawer front.

II. Description of the Prior Art

The most common method of attaching a drawer front to a four sided drawer box is with flat headed wood screws. The wood screws extend through the end panel of the drawer box into the back of the drawer front. However, this assembly offers no adjustment between the drawer front and the drawer box which can result in misalignment of the drawer front relative to the cabinet. Since modern drawer slides offer little adjustment of the orientation of the drawer itself, such misalignment can be critical.

Connecting assemblies which detachably connect the drawer front to the drawer box have also become popular. Those assemblies facilitate the attachment of two perpendicular panels and include a tightening bolt positioned within the drawer box and detachably receiving a fastener bolt secured to the drawer front. The fastener bolt includes a head which is received by the camming surface of the tightening bolt such that upon rotation of the tightening bolt, the fastener bolt and drawer front are drawn inwardly against the drawer box. The assembly merely provides a convenient method of detachably securing the drawer front to the drawer box. No means are provided for adjusting the orientation of the drawer front relative to the drawer box.

SUMMARY OF THE PRESENT INVENTION

The present invention overcomes the disadvantages of the prior known attachment assemblies for drawer fronts by providing a system which not only detachably secures the drawer front to the drawer box but also facilitates planar adjustment of the drawer front for proper orientation within the cabinet.

The drawer front attachment system of the present invention includes a tightening fastener rotatably disposed within a first bore in the drawer box parallel to the drawer front and a blind bore of the drawer front. The connector assembly includes a fastener rod which extends through a second bore in the drawer box perpendicular to the drawer front and in communication with the first bore such that a head of the fastener rod can be inserted into the tightening fastener. The fastener rod is threadably connected to a base housing mounted within the blind bore of the drawer front. The housing includes a fastener nut adapted to receive the rod. In a preferred embodiment, the nut is initially secured within the housing and thereafter released to float within the housing to facilitate adjustment of the drawer front.

Other objects, features, and advantages of the invention will be apparent from the following detailed description taken in connection with the accompanying drawer.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the view and in which.

DETAILED DESCRIPTION OF A PREFERRED EMBODIMENT OF THE PRESENT INVENTION

Figure 1:
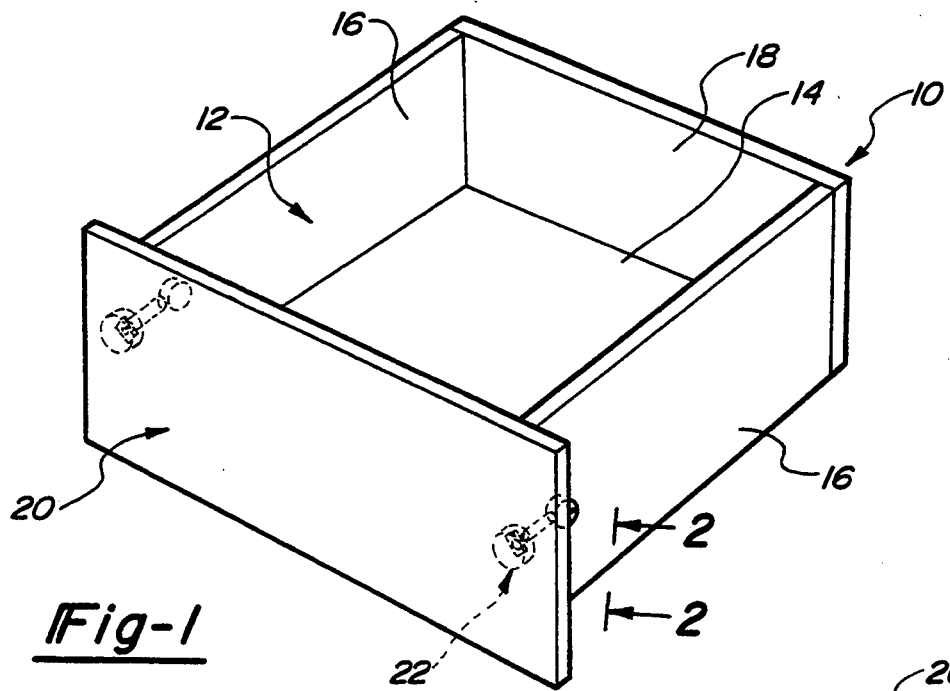
FIG. 1 is a perspective view of a cabinet drawer embodying the attachment system of the present invention.
Figure 2:
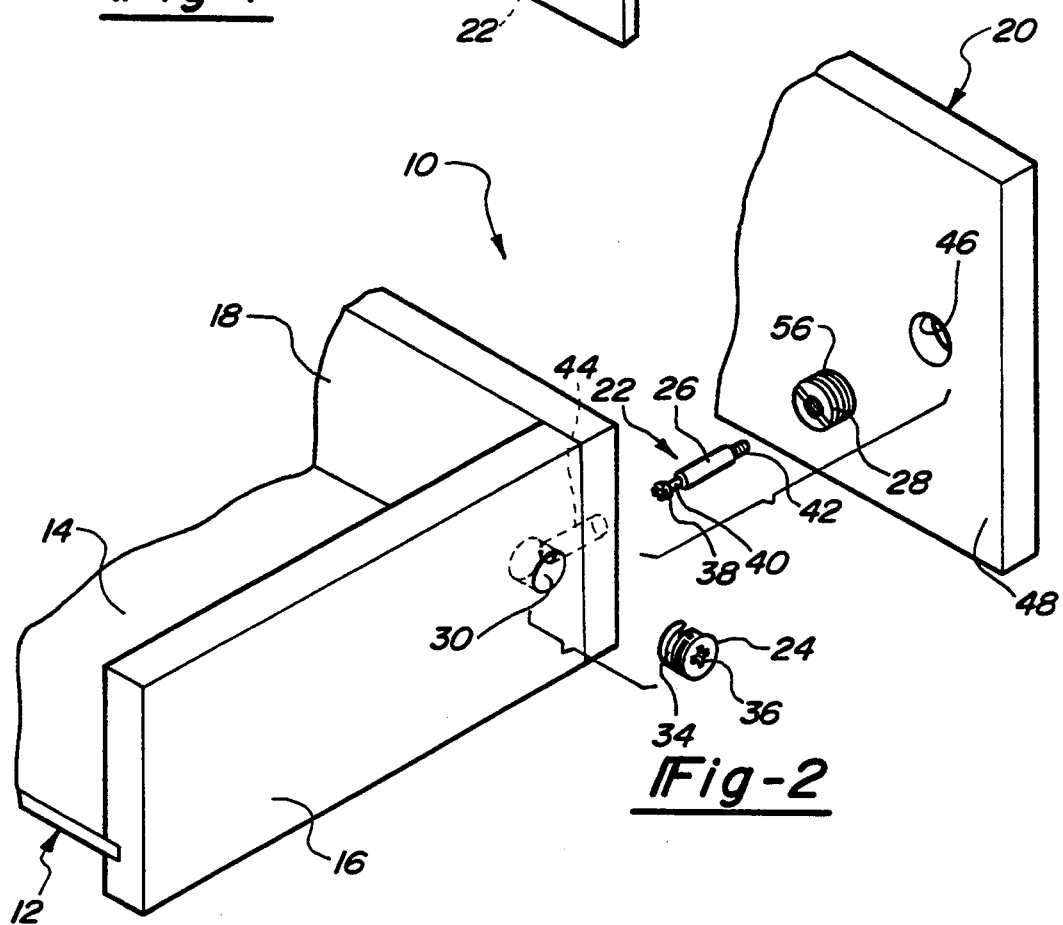
FIG. 2 is an enlarged exploded view of the attachment system for the drawings front.
Figure 3:
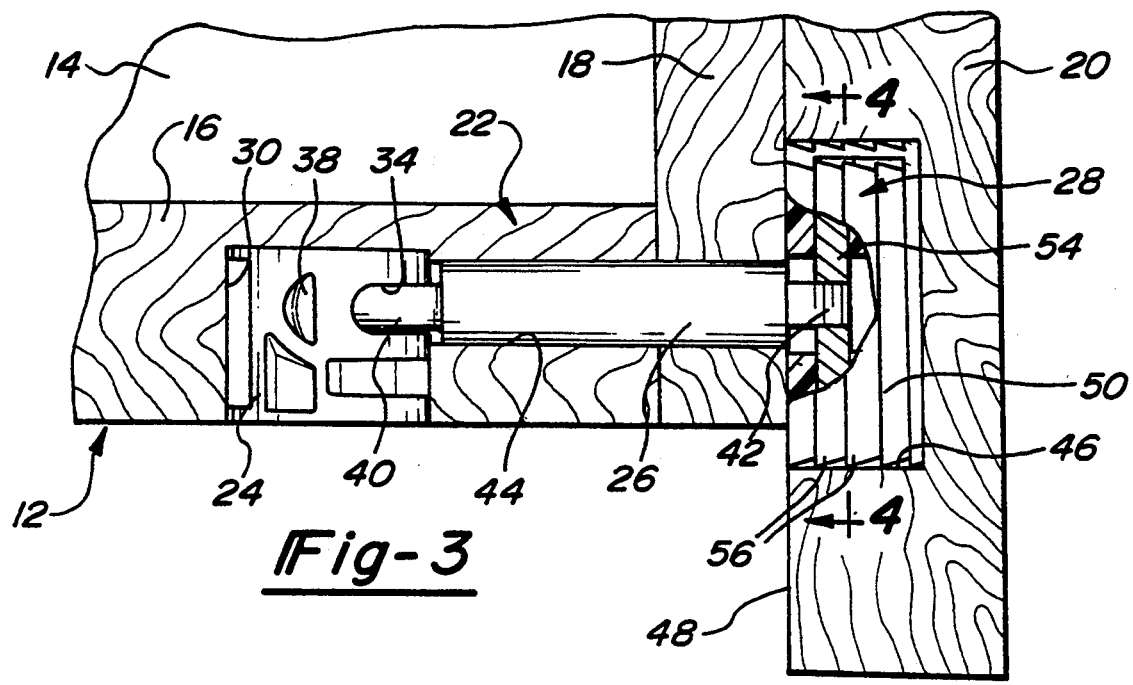
FIG. 3 is a cross-sectional view of the attachment system fully locked in position securing the drawer front to the drawer box.
Figure 4:
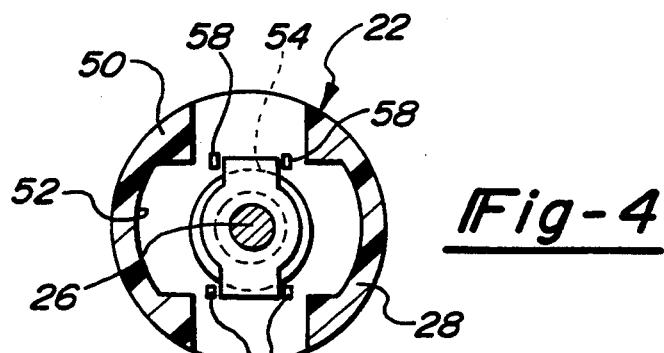
FIG. 4 is a cross-sectional view taken along lines 4—4 of FIG. 3 showing the fastener nut secured within the housing.
Figure 5:
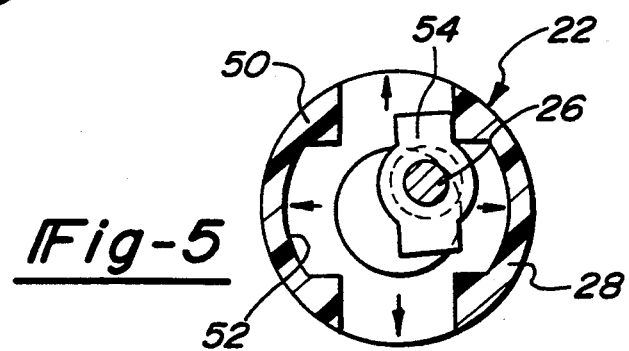
FIG. 5 is a cross-sectional view showing the fastener nut free-floating within the housing.
Figure 6:
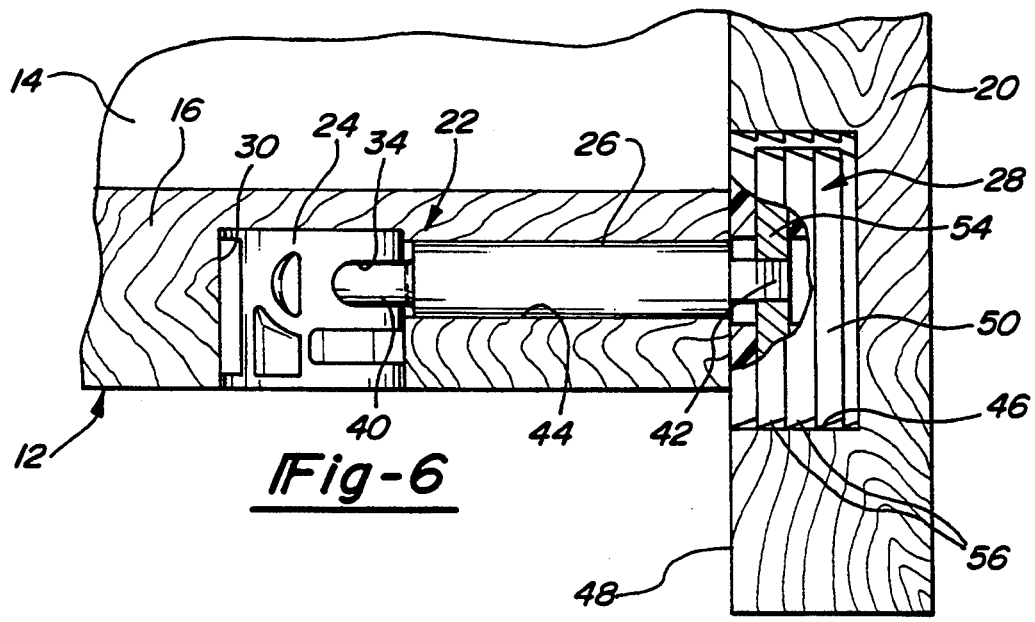
FIG. 6 is a cross-sectional top view of an alternative arrangement of the attachment assembly.

Referring first to FIGS. 1 and 2, there is shown a drawer 10 such as the type typically used in kitchen and bath cabinets. The drawer 10 is preferably mounted to a slide for selective withdrawal of the drawer 10 from the cabinet. The drawer 10 includes a drawer body 12 formed as a box with a bottom panel 14, side panels 16 and end panels 18. Alternatively, the drawer body 12 may omit the front end panel. A drawer front 20 is secured to the drawer body 12 using the present invention. The drawer front 20 may engage the front end panel 18 or, alternatively, the side panels 16 in a perpendicular orientation. In a preferred embodiment of the present invention, the drawer front 20 is detachably and adjustably secured to the drawer body 12 using an attachment system 22.

Referring now to FIGS. 2 through 5, the drawer front attachment system 22 comprises a tightening fastener 24 rotatably mounted within the drawer body, a fastener rod 26, and a base housing 28 mounted within the drawer front 20. Upon assembly, the fastener rod 26 connects the tightening fastener 24 to the housing 28 as will be subsequently described.

The tightening fastener 24 is rotatably mounted within a bore 30 formed in the side panel 16 parallel to the drawer front 20. The axis of rotation of the tightening fastener 24 is also parallel to the drawer front 20. The tightening fastener 24 includes an arcuate inner camming surface 32 and slot 34 to accommodate the fastener rod 26. An outer planar surface of the tightening fastener 24 includes means for rotating the fastener 24 such as cross 36 to receive a Phillips screwdriver.

The fastener rod 26 includes an enlarged head 38, a reduced neck 40 and a threaded tail 42. The neck 40 is sized to be received within the slot 34 of the tightening fastener 24 allowing the head 38 to travel along the camming surface 32 as the tightening fastener 24 is rotated. The fastener rod 26 is disposed within a second bore 44 perpendicular to the first bore 30 and in communication with both the first bore 30 and the exterior of the drawer body 12 at the forward face thereof. The fastener rod 26 is fed through the second bore 44 to engage the tightening fastener 24. As the tightening fastener 24 is rotated, the fastener rod 26 will be pulled inwardly as will be subsequently described.

The threaded end 42 of the fastener rod 26 is adapted to threadably engage the base housing 28. The base housing 28 is mounted within a hidden bore 46 formed in the rear face 48 of the drawer front 20. The base housing 28 includes a housing 50 with an interior chamber 52 and a fastener nut 54 disposed within the chamber 52. The housing 50 has a plurality of annular serrations 56 formed on its exterior surface which cooperates with the walls of the blind bore 46 to keep the base housing 28 within the drawer front 20. The fastener nut 54 is, at least initially, lockingly positioned within the chamber 52 of the housing 50 such that the fastener rod 26 can be threadably mated with the nut 54. The fastener nut 54 is maintained in an axial position (FIG. 4) by a plurality of break-away tabs 58 formed as part of the housing 50. Upon engagement with the fastener rod 26, the fastener nut 54 can float freely within the chamber 52 upon breaking the tabs 58. However, the fastener nut 54 will remain captured within the housing 50. Nevertheless, this freedom of movement allows adjustment of the drawer front 20 relative to the drawer body 12.

Figure 7:
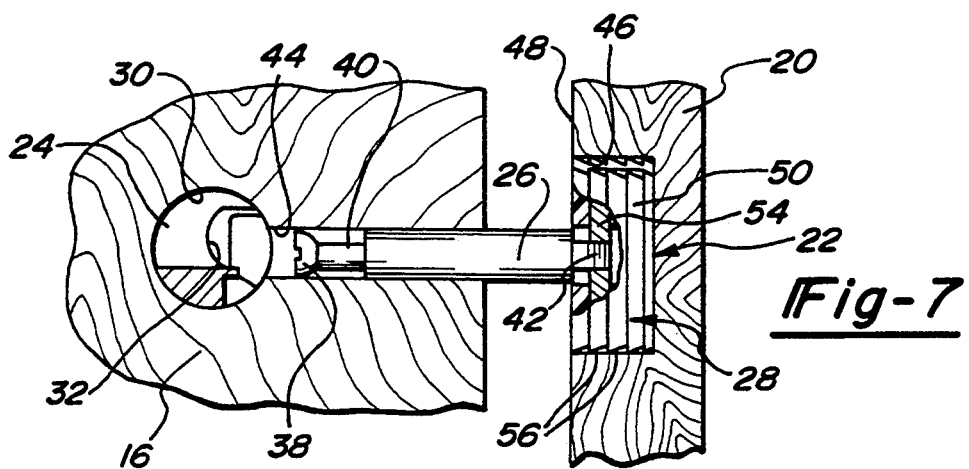
FIG. 7 is a cross-sectional side view of the fastener rod being inserted into the tightening fastener.
Figure 8:
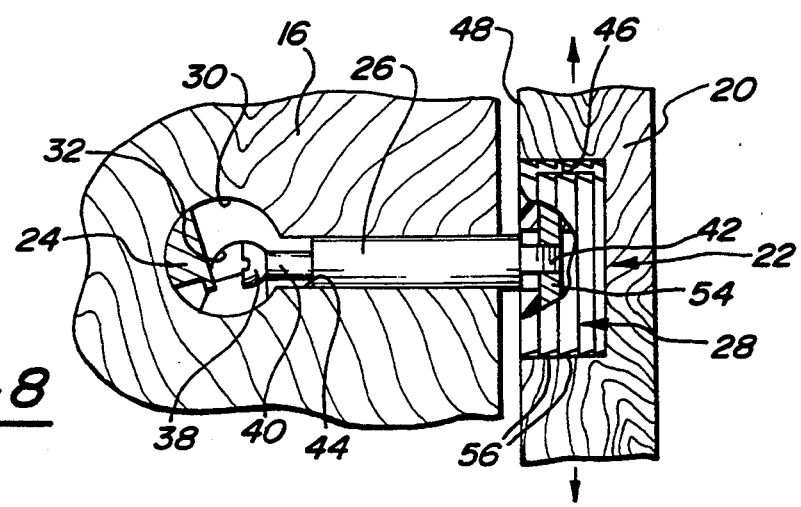
FIG. 8 is a cross-sectional side view of the fastener rod inserted into the tightening fastener whereupon adjustment of the drawer front may occur.
Figure 9:
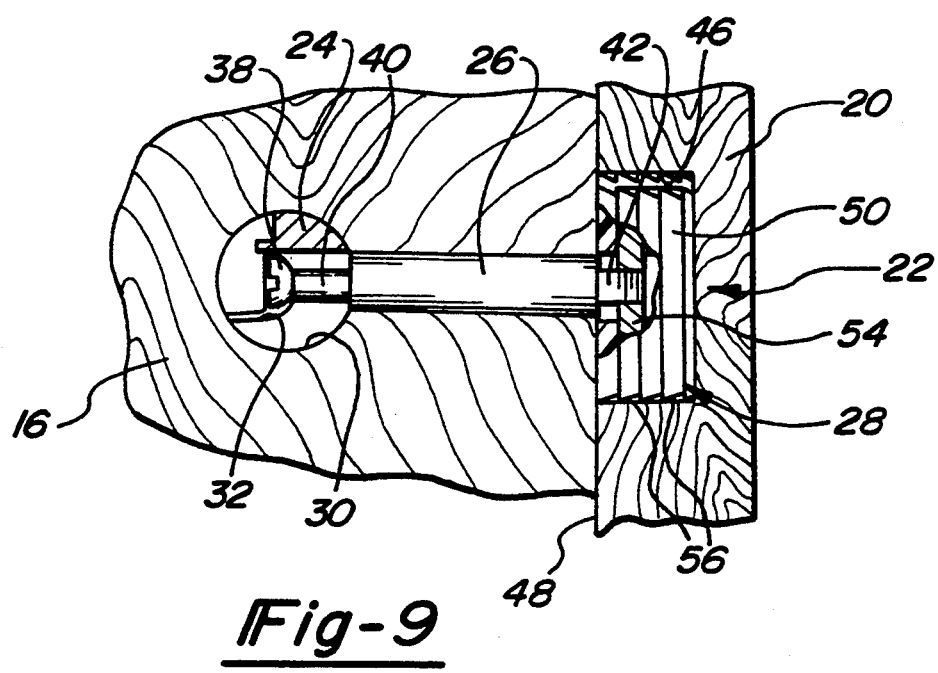
FIG. 9 is a cross-sectional side view of the attachment assembly fully engaged securing the drawer front to the drawer body.

Attachment of the drawer front 20 to the drawer body 12 simplified utilizing the attachment assembly 22 while allowing orientation of the drawer front 20. In the typical installation, at least two attachment assemblies 22 are used for each drawer 10, at least one of each side panel 16 of the drawer body 12. With the bores 30, 44 and 46 formed in the components of the drawer 10, the attachment assembly 22 may be properly inserted. Referring now to FIGS. 7 through 9, the tightening fastener 24 is positioned within bore 30 while the base housing 28 is positioned within bore 46. The threaded tail 42 of the fastener rod 26 is threadably connected to the nut 54 within the housing 50. The head 38 of the fastener rod 26 is then fed through the second bore 44 (FIG. 7) to engage the tightening fastener 24. The tightening fastener 24 is rotated (FIG. 8) such that the camming surface 32 "grabs" the head 38 of the fastener rod 26 while the neck 40 is positioned in the slot 34 of the tightening fastener 24. As the tightening fastener 24 is rotated, the head 38 will travel along the camming surface 32 pulling the fastener rod 26 and therefore the base housing 28 and drawer front 20 until the drawer front 20 is in flush engagement with the drawer body 12 securing the drawer front 20 as an integral part of the drawer 10.

Adjustment of the orientation of the drawer front 20 relative to the drawer body 12 and in particular the cabinet carrying the drawer 10, is readily accomplished with the present invention. Either just prior to securement of the drawer front 20 or following complete attachment, the drawer front 20 can be allowed to "float" relative to the drawer body 12 facilitating adjustment in any direction along the plane of the drawer front 20 for proper orientation. Upon applying a minimal amount of torque to the drawer front, the tabs 58 will break allowing the fastener nut 54 to float within the chamber 52. Since the fastener rod 26 is rigidly positioned within the drawer body 12, the drawer front 20 will be allowed to move relative to the body 12. Upon full engagement of the tightening fastener 24 the drawer front 20 will be drawn into frictional engagement with the drawer body 12 preventing any further movement of the drawer front 20.

If it becomes necessary to remove the drawer front 20 for replacement, repair or simply to add hardware, the tightening fastener 24 can be rotated until the fastener rod 26 is released from its grasp. The drawer front 20 can then be detached from the drawer body 12.

The foregoing detailed description has been given for clearness of understanding only and no unnecessary limitations should be understood therefrom as some modifications will be obvious to those skilled in the art without departing from the scope and spirit of the appended claims.

What is claimed is:

1. An attachment assembly for detachably and adjustably maintaining a drawer front on a drawer body, said attachment assembly comprising:

a tightening fastener rotatably mounted within a first bore in the drawer body, said tightening fastener including an arcuate camming surface with a slot;

a fastener rod detachably connected to said tightening fastener, said fastener rod selectively disposed within a second bore perpendicular to and in communication with said first bore and having a head portion, a neck portion and a tail, said head portion being selectively received on said camming surface of said tightening fastener as said neck portion extends through said slot whereby rotation of said tightening fastener causes said head portion to travel along said arcuate camming surface drawing said fastener rod toward said tightening fastener; and a base housing mounted within a blind bore of said drawer front and connected to said fastener rod, said base housing including a fastener nut and said housing having an interior chamber, said fastener nut selectively connected to said tail of said fastener rod;

said fastener nut movably captured within said chamber of said housing whereby upon attachment of said fastener rod to said fastener nut said drawer front is movably adjustable relative to said drawer body.

2. The attachment assembly as defined in claim 1 wherein said base housing includes a plurality of annular serrations formed on an exterior surface thereof, said serrations cooperating with said blind bore of said drawer front to prevent withdrawal of said base housing from said blind bore.

3. The attachment assembly as defined in claim 1 wherein said fastener nut is restrained within said housing interior chamber by at least one restraining tab, said at least one tab being breakable to release said fastener nut for freedom of movement within said housing interior chamber.

4. The attachment assembly as defined in claim 3 wherein said fastener nut threadably receives said tail of said fastener rod.

5. An attachment assembly for detachably and adjustably maintaining a drawer front on a drawer body, said attachment assembly comprising:

a tightening fastener rotatably mounted within a first bore formed coaxially with an axis of rotation of said tightening fastener, said tightening fastener including an arcuate camming surface disposed perpendicular to the axis of rotation, said camming surface including a slot;

a fastener rod detachably connected to said tightening fastener, said fastener rod selectively disposed within a second bore perpendicular to and in communication with said first bore to connect to said tightening fastener, said fastener rod having a head portion, a neck portion and a threaded tail, said head portion being selectively received on said camming surface of said tightening fastener upon insertion of said neck portion into said slot whereby rotation of said tightening fastener in a first direction causes said head portion to travel along said arcuate camming surface drawing said fastener rod towards the rotational axis of said tightening fastener; and a base housing mounted within a blind bore of said drawer front and connected to said fastener rod, said base housing including a threaded fastener nut and said housing having an interior chamber, said fastener nut threadably connected to said tail of said fastener rod;

said fastener nut movably captured within said interior chamber of said housing whereby upon attachment of said fastener rod to said fastener nut mounted within said drawer front and said tightening fastener mounted within said drawer body, said drawer front is movably adjustable relative to said drawer body for desired relative orientation.

6. The attachment assembly as defined in claim 5 wherein said base housing includes a plurality of annular serrations formed on an exterior surface thereof, said serrations cooperating with said blind bore of said drawer front to prevent withdrawal of said base housing from said blind bore.

7. The attachment assembly as defined in claim 5 wherein said fastener nut is releasably restrained within said housing interior chamber by a plurality of restraining tabs, said tabs selectively breakable to release said fastener nut for freedom of movement within said housing interior chamber facilitating movement of said drawer front relative to said drawer body.

8. In an attachment assembly for adjustably maintaining a first panel perpendicular to a second panel, said second panel including means for selectively securing said first panel relative to said second panel, said securing means having a fastener rod extending from said second panel, the improvement comprising:

a base housing mounted within a partial bore of said first panel and connected to said first fastener rod of said securing means, said base housing including a fastener nut and said housing having an interior chamber, said fastener nut movably captured within said interior of said housing whereby upon attachment of said fastener rod to said fastener nut, said first panel is movably adjustable relative to said securing means and said second panel facilitating relative orientation of said first and second panels.

9. The attachment assembly as defined in claim 8 wherein said base housing includes a plurality of annular serrations formed on an exterior surface thereof, said serrations cooperating with said partial bore of said first panel to prevent withdrawal of said base housing from said first panel.

10. The attachment assembly as defined in claim 8 wherein said fastener nut is releasably restrained within said housing interior chamber by a plurality of restraining tabs, said tabs selectively breakable to release said fastener nut for freedom of movement within said housing interior chamber facilitating movement of said first panel relative to said second panel.

* * * * *